United States Patent [19]

Phillips

[11] 4,076,016
[45] Feb. 28, 1978

[54] APPARATUS FOR THE UTILIZATION OF SOLAR HEAT

[76] Inventor: Maurice E. Phillips, 182 Dellenberger Ave., Akron, Ohio 44312

[21] Appl. No.: 622,149

[22] Filed: Oct. 14, 1975

[51] Int. Cl.$^2$ ............................................. F24J 3/02
[52] U.S. Cl. ..................................... 126/271; 126/270
[58] Field of Search ............... 126/270, 271; 237/1 A; 60/641

[56] References Cited

U.S. PATENT DOCUMENTS

| | | | |
|---|---|---|---|
| 2,907,318 | 10/1959 | Awot | 126/271 |
| 3,894,685 | 7/1975 | Keyes | 126/270 |
| 3,939,818 | 2/1976 | Hamilton | 126/270 |
| 3,982,527 | 9/1976 | Cheng et al. | 126/271 |
| 3,985,116 | 10/1976 | Kapany | 126/271 |

FOREIGN PATENT DOCUMENTS

| | | | |
|---|---|---|---|
| 811,015 | 4/1937 | France | 126/271 |
| 31,227 | 5/1885 | Germany | 126/270 |

*Primary Examiner*—Kenneth W. Sprague
*Assistant Examiner*—James C. Yeung
*Attorney, Agent, or Firm*—Oldham & Oldham Co.

[57] ABSTRACT

My invention relates to a unique apparatus for the utilization of solar heat which incorporates a hexagonal shaped collector element, which achieves maximum heat utilization in conjunction with a heat pipe for transfer of the heat collected by the element. Various minor modifications can be made to the heat collector element and/or the heat transfer pipe without departing from the spirit or the scope of the invention. Basically, however, it is the hexagonal shaped heat collector element with the heat transfer pipe passing therethrough at substantially the optimum position so that maximum heat transfer occurs from the heat collector element to the pipe within each individual element. The entire apparatus can be adjusted for optimum sun angle, depending upon the hemisphere or latitude of use, and extremely efficient heat transfer and use of solar energy is possible.

7 Claims, 11 Drawing Figures

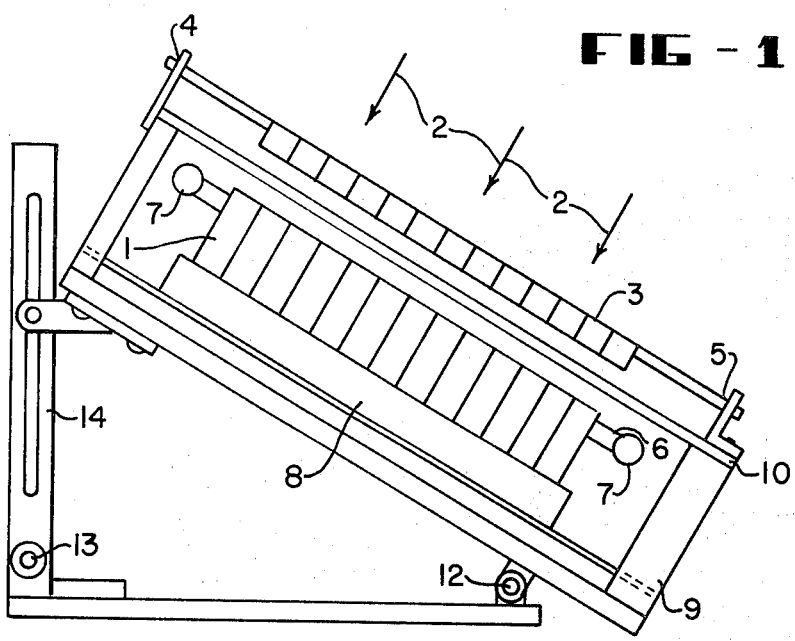
FIG-1
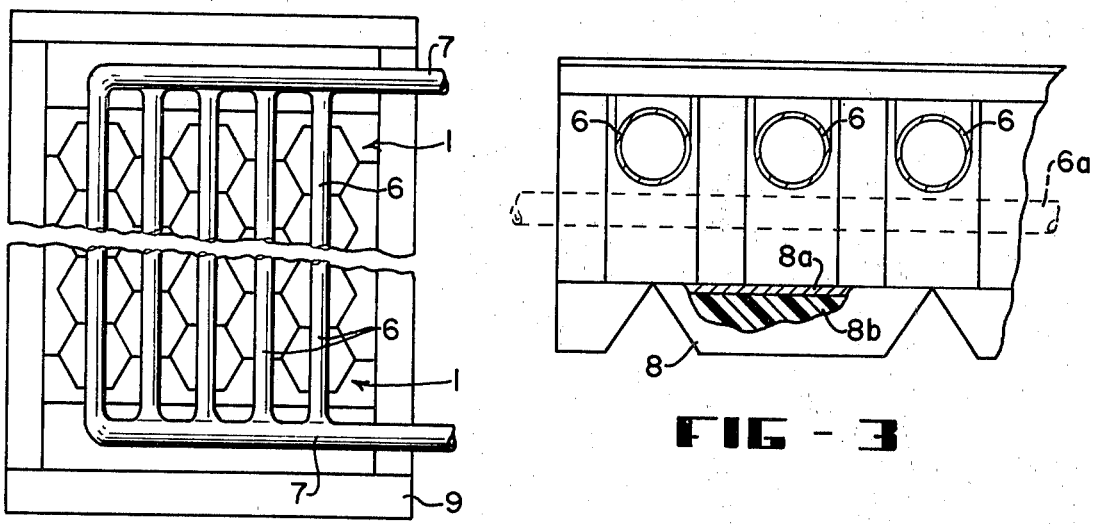
FIG-2
FIG-3
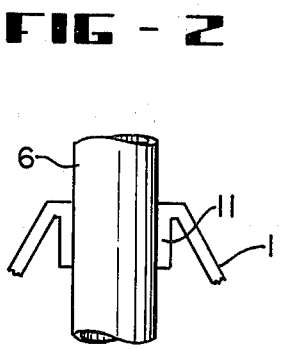
FIG-6
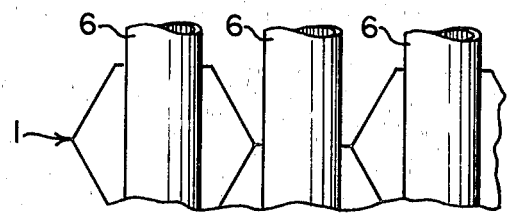
FIG-4

4,076,016

APPARATUS FOR THE UTILIZATION OF SOLAR HEAT

PRIOR ART

Heretofore, it has been known that there have been many and various attempts to harness the energy of the sun in solar collectors, which in many instances have been elaborate, expensive, and yet relatively inefficient. Most of these prior attempts, to the best of my knowledge, have incorporated expensive mirrors, or some type of transfer of the sun's energy into electricity, and the like. They have been impractical due to having to have very large size, are unsightly, and are not really suitable for home or business use to any degree.

A typical example is the "solar furnace" described in an article beginning on page 102 of the Feb. 1975 issue of "Popular Mechanics." Here, the author indicates that the secret of the solar collector's high output lies in closely spaced aluminum cups behind a glass face. These cup designs, however, are believed to be substantially less efficient than the hexagonal design that the instant invention contemplates. The invention, however, does contemplate utilizing the rock type heat storage bed described in this article, which is well known by those skilled in the art.

OBJECTS OF THE INVENTION

It is therefore a general object of the invention to provide an efficient solar collector that is adaptable to a hot air blower for utilization of solar heat, which apparatus is inexpensive, yet highly efficient, and which makes apparatus of this type possible for home use.

A further object of the invention is to utilize the unique hexagonal shaped solar collector to generate heat, with a heat transfer pipe associated with the collector to achieve the maximum efficiency of heat transfer from the collector.

A further object of the invention is to provide that the solar collector can be manufactured from sheet metal, styrofoam, or the like to minimize the cost, yet still maintain the high efficiency desired.

A further object of the invention is to be able to make the solar collector adaptable for any size installation, and which can incorporate various types of heat transfer pipes associated therewith, while still maintaining the high efficiency of the system.

For a better understanding of the invention, reference should be made to the accompanying drawings wherein, FIG. 1 is a side view of the assembled apparatus comprising a preferred embodiment of the invention;

FIG. 2 is a view perpendicular to the apparatus of FIG. 1 showing the arrangement of the solar collectors and the heat pipes associated therewith;

FIG. 3 is a view looking parallel to the collector pipes in FIG. 2 and drawn to a larger scale;

FIG. 4 is a partial view of the cellular solar collector and the respective collector pipes associated therewith as seen in FIG. 2;

FIG. 6 is a detailed view of the cellular solar collector of FIG. 5 showing more of the flanged construction at the contact area between the collector and the heat transfer pipe;

Figure 5:
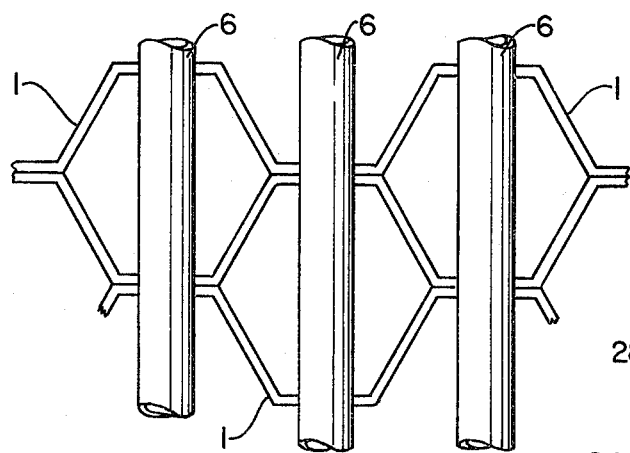
FIG. 5 is a partial view of the cellular solar collector of a modified construction.

With reference to the embodiment of the invention illustrated in FIG. 1 of the drawings, the numeral 1 indicates generally a cellular, preferably metal, collecting means comprising the essence of the solar collector of the invention. The numeral 2 designates a plurality of arrows representing the rays of the sun passing through a screen 3 having a cellular construction similar in form to the apparatus 1. The screen 3 is mounted on a bearing 4 and bearing 5 on hinge 13 with an adjustable bracket 14 for positioning the screen 3 and the complete assembly for best utilization of the sun's rays. This procedure is understood by one skilled in the art so that the angular relationship will be optimum for the latitutde of the apparatus, and can even be appropriately programmed to tilt during the day to take the maximum advantage of the sun's rays. The screen 3 is open-ended on each end and serves merely to direct the sun's rays into the solar collectors 1 to increase the efficiency of the invention.

A number of heat transfer collector pipes 6 pass through and are supported by the solar collectors 1 and are attached to header pipes 7 which lead to and from a storage means or a radiator (not shown) such as the rock bed defined above in which the heat transfer liquid or gas exchanges heat in the space or vessel to be heated. This, of course, could also comprise the house or whatever other structure or area it was desired to heat. The heat transfer liquid or gas may circulate by thermo-siphon action or may be pumped, and appropriate equipment to accomplish these ends is not shown, but is well understood by those skilled in the art.

The cellular solar collecting means 1 is supported by bottom plate 8 which is shown in more detail in FIG. 3 and to a larger scale. All of the parts illustrated in FIG. 1 are supported by frame 9 closed on top by a sheet of glass 10 which allows the sun's rays to enter the cellular collector 1 and at the same time makes an air tight enclosure for the cellular solar collectors 1, collector pipes 6, header pipes 7, and supporting plate 8.

As an essential part of the invention, I have made the solar collectors 1 with hexagonal shaped cells for best utilization of space and for optimum reflection of the sun's rays within each individual cell for maximum efficiency and heat transfer as will be more fully explained hereinafter. I have found, contrary to the popular opinion that a curved surface will tend to collect more heat, that in fact the hexagonal surface with flat surfaces between sides tends to focus the heat from the sun's rays onto a central point, and it is at this point that I place the transfer pipe 6 so that the maximum heat is focused and concentrated on the pipe for maximum efficiency. Preferably, the sides of the solar collectors 1 are painted black or are black in color so as to basically absorb heat to provide a more uniform distribution of heat within the cells 1 for transfer to the heat pipes 6.

I have also found that the supporting plate 8 should be well insulated from the carrying frame or base, and to this end I prefer an aluminized surface over styrofoam or the like so that all heat which hits the base 8 will be reflected and radiated back up into the cells 1 and collected by the heat pipes 6.

While I have indicated in FIG. 2 that the pipes 6 extend longitudinally through the arranged collector cells 1, it should be understood that it would be possible to run pipes also transversely therethrough so that there would, in effect, be two pipes passing through each solar cell, one arranged above the other, and this is illustrated by the dotted line indication in FIG. 3 as 6a. The insulated relationship of supporting plate 8 is indicated in broken-away section in FIG. 3 with the aluminum plate indicated by numeral 8a and the styrofoam insulation backing illustrated by numeral 8b. Again, preferably the surface of the aluminum face plate 8a will be painted a dull black.

FIG. 6 illustrates a flanged connection 11 at the contact area between the cellular collectors 1 and the collector pipes 6 for better heat transfer. It is anticipated that the cellular collector pipes 6 should be preferably made from copper or aluminum or other good heat transfer material, while the collector cells 1 are also made from the same type of material so that heat transfer readily takes place with maximum efficiency.

Figure 7:
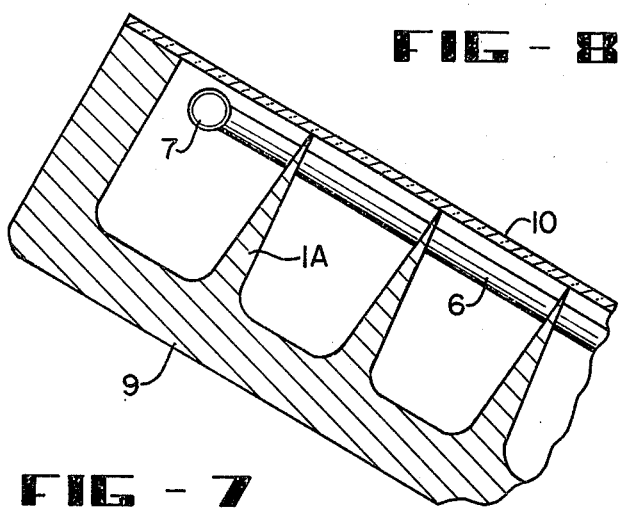
FIG. 7 is a part section through a heat utilization apparatus similar to that shown in FIG. 1 with minor modifications.

FIG. 7 illustrates a modified embodiment of the invention which is similar to that shown in FIG. 1, except that the cells of the solar collector 1 of FIG. 1 have been made an integral part of the frame 9 permitting the entire assembly of frame 9 and cellular collector 1 to be molded of plastic, styrofoam or metal for ease and economy of manufacture. In this embodiment I have also shown glass 10 in close proximity to the tops of the collector cells 1a for entrapment of heat within each separate cell and subsequent transfer of heat to the collector pipes 6 by conduction, convection, or radiation. Other details shown in FIG. 1 may also be used with the construction shown in FIG. 7. I prefer the molded styrofoam with an aluminized surface then sprayed over the styrofoam and the dull black paint then sprayed over the aluminized coating. Preferably, the coating of the aluminum should be at least between 0.001 inches to 0.050 inches, with sufficient thickness to obtain optimum reflection. To this end, the styrofoam backing for insulation should preferably be approximately ¼ inch thick, although normally one would want to have a greater insulation effect than is ever anticipated so that efficiency is maintained at maximum value.

In the operation of my invention, with the apparatus shown in FIG. 1 placed in sunlight with rays of sun perpendicular to glass 10, it should be understood that these rays pass unobstructed through glass 10 and some of them impinge directly on the collector pipe 6 delivering heat to the surface of collector pipes 6. This heat is transferred by conduction through the wall of collector pipes 6 to the fluid or gas within. Other of the sun's rays will impinge on parts of the cellular solar collectors 1 and will be transferred by conduction to collector pipes 6 and thence to a liquid or gas within the pipes. Still other rays will find their way to the bottom plate 8 giving up heat to bottom plate 8, which heat is conducted to cellular conductor 1, or to air which surrounds the collector assembly consisting of the cellular collector 1 and collector pipes 6 and header pipes 7. This air will circulate within the framework 9 to deliver heat to collector pipes 6 and to header pipes 7 and thence to the heat transfer fluid or gas within. Normally, I anticipate an appropriate blower passing air through the heat transfer pipes to take the heat away in a maximum efficiency flow relationship which will be balanced according to the system, the size, and the amount of sunlight normally encountered at a particular latitude.

Figure 8:
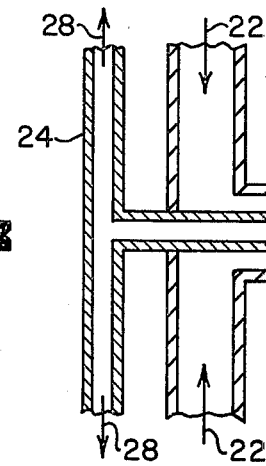
FIG. 8 is a broken-away, cross-sectional view of a modified heat transfer pipe.

As one further modification to the invention, I anticipate that a multiple number of pipes might be incorporated in the manner shown in FIG. 8 where air flow might be in both ends of larger pipe 20, as illustrated by arrows 22, and thence passing around the closed end and into the opening of pipe 24, as illustrated by arrow 26, for outflow as indicated by arrows 28. This arrangement, which could be totally carried within each respective collector cell 1, would provide more heat transfer surface within the collector cell and probably great efficiency in the operating unit.

Figure 9:
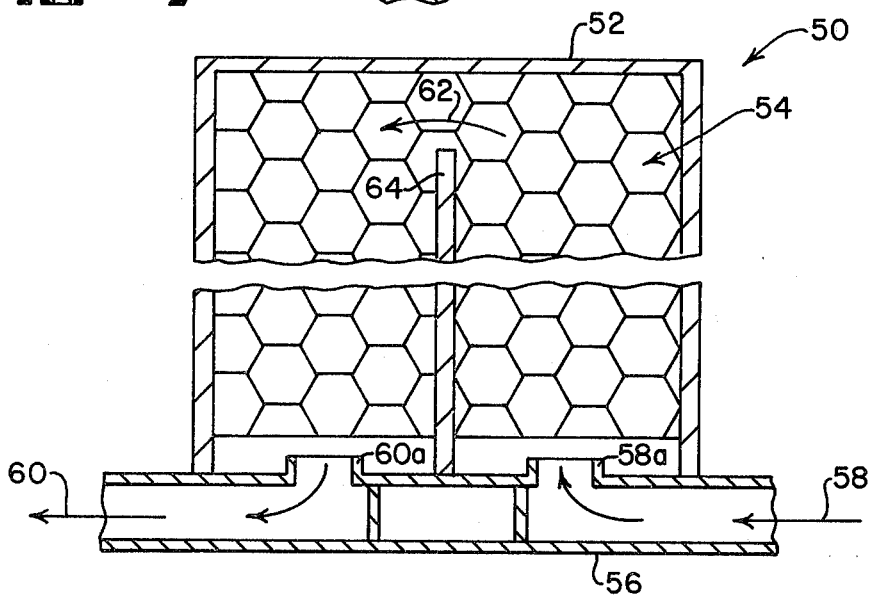
FIG. 9 is a broken-away plan view in partial section of a modified air flow arrangement to obtain the heat transfer from the novel cellular construction of the invention.

Referring to FIG. 9 of the drawings, the numeral 50 indicates generally a solar collector apparatus comprising a frame 52, having a plurality of the same type of hexagonal shaped heat exchangers indicated generally by numeral 54 positioned therein as in the previous embodiments of the invention. Here, however, a change from the basic structure occurs in the use of a header section of pipe 56 having an inlet indicated by arrow 58 and an outlet indicated by arrow 60, which provides a fluid flow into the inlet nipple 58a and back out through the outlet nipple 60a in the path indicated generally by the arrow 62. It should be understood that the path in effect passes through, around, and under all of the collectors 54 on the right hand side of the median partition 64, and thence down the left hand side of the median partition 64 through, under, and around all of the collectors on that side before passing out the outlet port 60a. This arrangement, of course, simplifies the piping system associated with the previous embodiments, and yet provides a high heat transfer to the fluid passage as it passes under, around, and through the various collectors 54.

Figure 10:
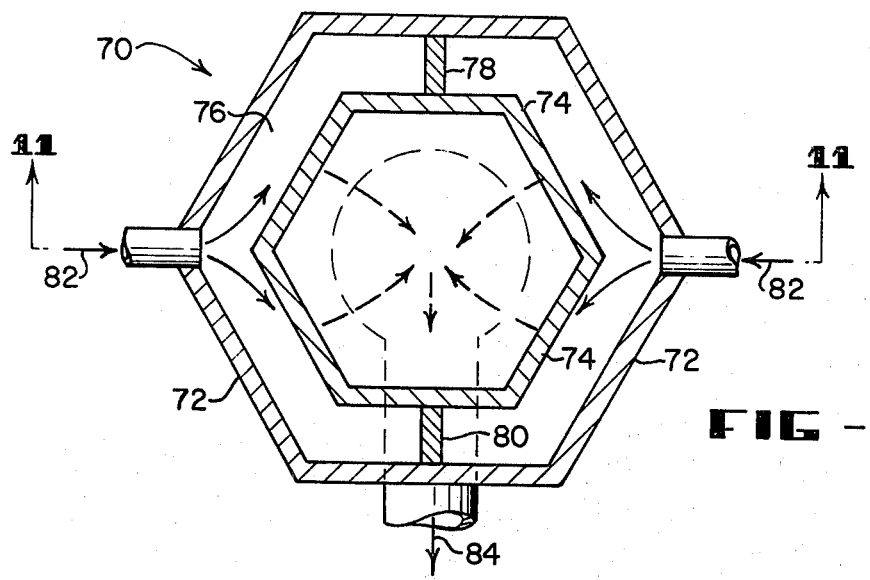
FIG. 10 is a cross-sectional plan view of a modified form of cell using a fluid such as water for the heat transfer.
Figure 11:
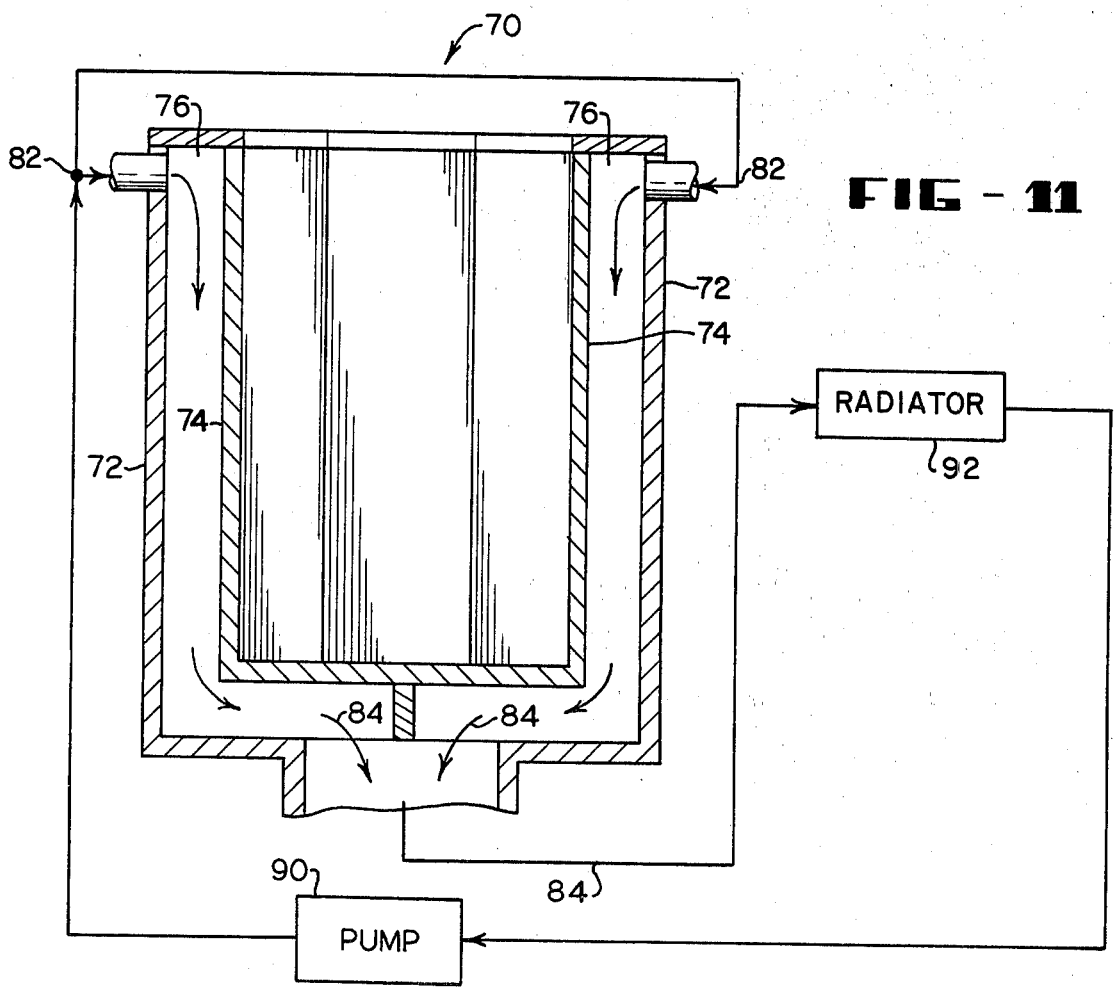
FIG. 11 is a cross-sectional schematic of the cell of FIG. 10 taken on line 11—11 thereof.

A further embodiment of the invention is illustrated in FIGS. 10 and 11, which show in effect a double-walled heat collector indicated generally by numeral 70, which, as can be seen, comprises an outer wall 72, and an inner wall 74 in the same hexagonal shape. The view in FIG. 10 is in cross section and illustrates that a relatively small space 76 is provided between the walls 72 and 74. The opening 76 is actually divided into two separate sections by partition members 78 and 80, so that fluid can enter say the left and right sides, as indicated by arrows 82, to wipe all of the heat from that side of both inner and outer walls 72 and 74, pass under the bottom, and out as indicated by arrows 84. This fluid arrangement is perhaps better shown in FIG. 11 where the fluid enters on both the left and right sides near the top of the dual wall collector, passes down between the walls, across the bottom and out. It is anticipated that in this construction the fluid median will be water or some equivalent, and that an appropriate pump indicated by numeral 90 will supply the fluid input as indicated by arrow 82, and the fluid output as indicated by arrow 84 will pass into an appropriate radiator 92 before returning to the suction side of pump 90. It is further anticipated that the pump will be positioned beneath the collectors 70 so that should a failure or leak occur all of the fluid will drain from the respective cells by gravity. This gravity draining, of course, is facilitated by the fact that the fluid is sent into each of the cells near the top and taken off at the bottom, as of course best seen in FIG. 11.

As a feature of the invention, it should be understood that the collector cell walls, as well as the walls of the pipes or anything that is coming into contact with the sunlight should be of anodized aluminum, which will change the wave length of the incoming sunlight so that the rays will not reflect outwardly through the glass again, but will be captured within the enclosure of the heat exchanger for greater efficiency.

Of course, it is to be understood that the various embodiments involved, all really relate to different methods for transferring the heat from the collector cells to some sort of medium for use of the heat. However, all of the embodiments incorporate the same type of collector cells, namely the hexagonal shape, which tends to direct or focus the effect of the heat collected therein, and thereby augment the efficiency of the system, which is not possible with a circular type collector because certain of the rays will tend to oppose each other, and cancel the energy transfer ability thereof.

While in accordance with the patent statutes I have shown a preferred embodiment of my invention, it is to be understood that the invention is not limited thereto or thereby, but that the inventive scope is defined in the appended claims.

What is claimed is:

1. Apparatus for the utilization of solar heat comprising,
    a carrying frame,
    a plurality of hexagonal shaped solar collector cells carried by the frame having an open end directed toward incoming sunlight and a closed end, the cells on the closed end being of a high heat transfer metallic material,
    a pair of spaced, substantially parallel header pipes on opposite sides and inside of the frame,
    a plurality of substantially parallel heat transfer collector pipes connected at opposite ends to the header pipes and passing through the upper, center portion of each cell to obtain maximum focused heat, and
    means to pass fluid through the header pipes and the heat transfer collector pipes to collect the heat passed by conduction, radiation, and convection to the fluid through the heat transfer pipe.

2. Apparatus according to claim 1 where the frame is enclosed and insulated, and includes a glass face plate to allow transfer of the sun's rays therethrough into the solar collectors, and where the collector pipe passes through each cell.

3. Apparatus according to claim 2 which includes insulation for the base of the solar collectors from the carrying frame.

4. Apparatus according to claim 3 where the surface of the solar collectors and the base is coated with a dark covering, which is substantially independent of heat collection or absorption characteristics.

5. Apparatus according to claim 4 where the heat transfer pipes are made from a highly conductive metallic material.

6. Apparatus according to claim 5 which includes at least two heat transfer pipes positioned within each collector cell.

7. Apparatus according to claim 6 wherein the collector cells interlock with each other in a honeycomb configuration.

* * * * *